May 31, 1955 A. DEL CARLO 2,709,775
AUTOMATIC REGULATION SYSTEM FOR ELECTRIC MACHINES
Filed July 24, 1952 2 Sheets-Sheet 1
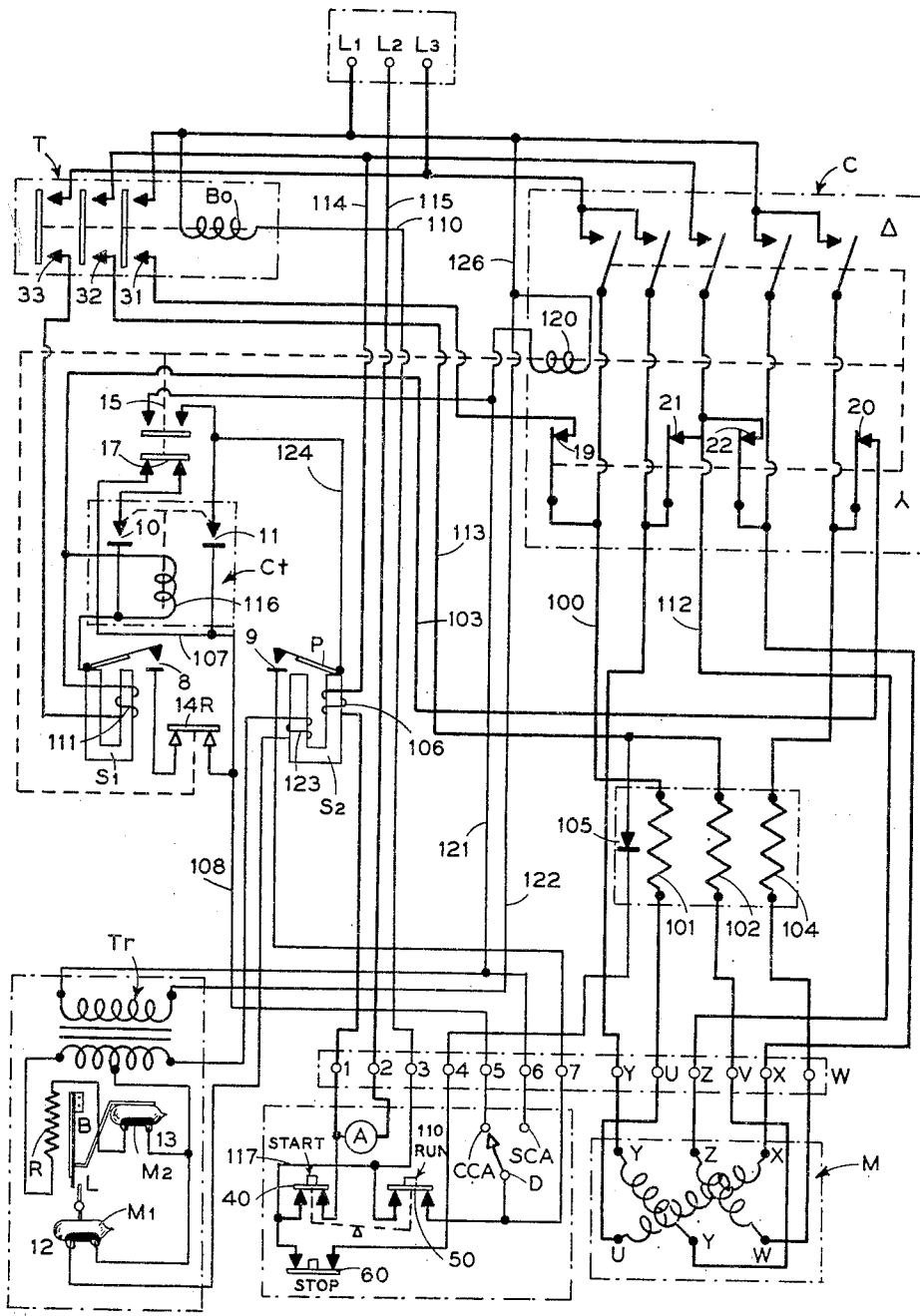
FIG. 1
INVENTOR.
ANGIOLINO DEL CARLO
BY
ATTORNEY

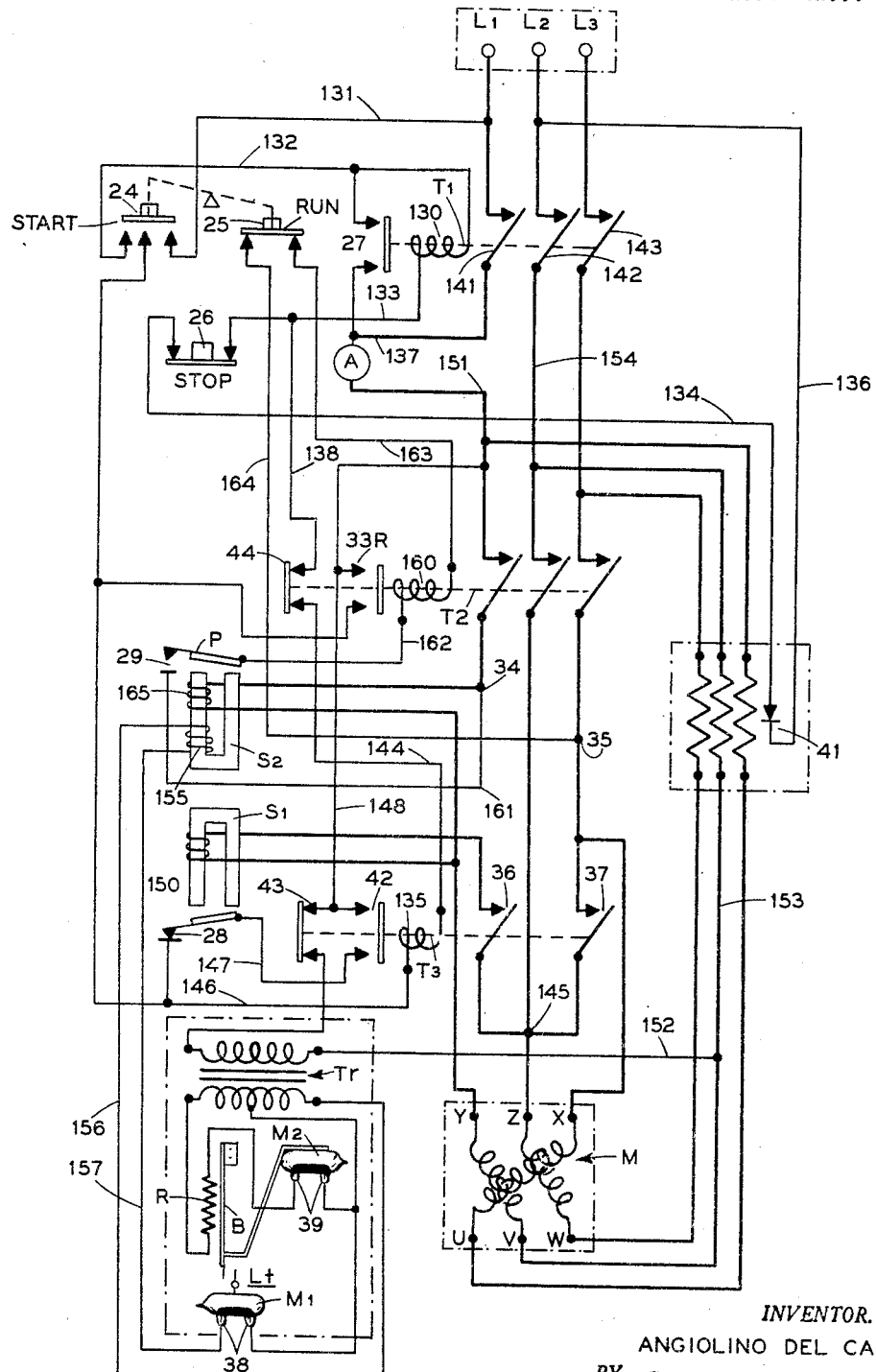
FIG. 2
*INVENTOR.*
ANGIOLINO DEL CARLO
BY
ATTORNEY

United States Patent Office 2,709,775
Patented May 31, 1955

2,709,775

AUTOMATIC REGULATION SYSTEM FOR ELECTRIC MACHINES

Angiolino Del Carlo, Milan, Italy, assignor to S. A. M. I. C. E. N. Società Azionaria Mantovana Imprese Costruzioni e Navigazione, Milan, Italy Application July 24, 1952, Serial No. 300,709

8 Claims. (Cl. 318—226)

The object of the present invention is a control system for the automatic starting and running of dynamic electric machines, and in particular of polyphase induction motors.

It is known how the efficiency, the power factor and other characteristics of electric machines, and particularly of electric motors, vary greatly under the widely different load conditions to which they may be exposed in their various applications. While it is possible in designing such machines, to attain quite high efficiency and power factor values for near full load working conditions, it is impossible to maintain such values over the full range of the possible loads, and with motors running light or at very small loads (which is sometimes unavoidable even for long periods of time) the efficiency and the power factor are reduced to such low levels as to markedly affect the operating costs.

When an electric machine is required to operate at variable loads, it is possible to improve its efficiency and power factor by varying the supply characteristics and the system of connections of its windings, but the advantages thus obtainable cannot be applied to operating conditions resulting from widely and quickly variable loads unless a control system is available that is capable of automatically switching such connections in accurate response to such load fluctuations and E. M. F. variations.

Known control systems of this type have various disadvantages due to the tendency to set up oscillating disturbances and excessive current flows. Furthermore, the wear on switch contacts and other movable parts is quite considerable.

The control apparatus of the object of the present invention avoids the foregoing disadvantages as it provides for limiting the switching operations, independently of the load fluctuations; in other words, the control system provides for switching the connections only for such load variations as are maintained for a certain length of time.

More precisely, according to the invention, in the case of a three-phase motor for instance, when the motor windings are delta-connected, a current flows through a shunt winding of a relay controlling the switching of the motor widings, keeping the relay closed, whatever be the load applied to the motor. This current, locking said relay, is periodically cut off, for instance for one second every minute, so that only during this interruption is the relay free to operate, and, if the load at such times is below the set value, the switching from delta to star connection will actually take place. The periodic interruption of the current supplied from a supplementary source, is obtained by means of a simple device, such as for instance a device with a bimetallic strip and two mercury-bulb switches. This limitation of the switching operations insures a long life of the control system, without any detriment to the power consumption.

Further, according to the present invention, the relay controlling the star-delta and delta-star switching, is designed to afford a very high pick-up or drop-out speed of its contacts. According to another feature of the invention, this relay may be of the closed magnetic circuit type, the magnetic circuit being closed by a movable armature. More specifically, this relay operates in the following way; a strong current inrush, circulating in its series winding, causes its movable armature to be picked up, thus closing the magnetic circuit, together with electric contacts operated by said armature, overriding the action of a pull-out spring. Once the movable armature has closed the magnetic circuit, this will stay closed even when the current flowing through the series winding is greatly reduced. The pull-out spring will pull open the armature at a predetermined value of the current, that may be adjusted by varying the tension of said spring and will correspond to the predetermined value required for the switching from the delta to the star connection.

To assure a stable closing of the magnetic circuit of the relay, and thus of the contacts operated by the relay, an auxiliary winding on the relay is energized instantaneously when the motor windings are switched from star to delta. This auxiliary winding is maintained energized as long as the motor windings are delta connected, although its energization is periodically momentarily interrupted for an interval of one second during every minute, for example.

The armature will thus be able to drop out from the core, and open the electric contacts, only during one of said interruption periods, and the dropping-out of the armature, due to the magnetic hysteresis of the core, will take place in a snappy way without vibrations, as a result of the particular constitution of the magnetic core. With such an improved operation of the relay, all the other contacts controlled by the relay will effect quick and efficient closings thus contributing to a perfect operation of the control and to a long life of its parts.

For an understanding of the invention principles reference is made to the following description of typical embodiments thereof as illustrated in the accompanying drawings. In the drawings:

Fig. 1 is a schematic wiring diagram of one embodiment of the invention switching system; and Fig. 2 is a schematic wiring diagram of another embodiment thereof.

In the illustrated embodiments, it is convenient that the phase circuit switching operations, in response to the load, be controlled and limited only when there is a load reduction variation, that is when the motor has to be switched from the delta to the star-connection, whereas when the motor is running star-connected and, due to a load increase, it should be switched back to the delta-connection, the limiting device does not intervene and allows the immediate change-over to the other connection.

By such a control of the automatic circuit switching operation the motor is operated under conditions approaching its maximum or full-load efficiency. The motor is ready for the instantaneous switching from star to delta upon a sudden load increase. This avoids a delayed switching of the connection which may cause a motor showdown with a consequent large current inrush. Similarly any motor driven machines will not be affected by a loss of power on their driving motors, thereby avoiding excessive speed fluctuations resulting in large power consumption increases.

The switching operations from delta to star connection are instead effected under the control of an equipment that allows the switching of the circuits only for any load variation the duration of which exceeds the locking time of the control apparatus.

Of course, the circuit switching may take place also for a load variation of limited duration when the load variation does happen during the unlocking period of the device. The time interval of the control device may be varied within a rather wide range in accordance with the characteristics of the motor and of the operating machine or machines.

In the embodiment of the invention illustrated in Fig. 1, the control equipment is essentially constituted by a line breaker T, a contactor $Ct$, two relays S1 and S2, a current limit device $Lt$ and an automatic star-delta switch C.

This equipment is connected to the supply network L1, L3 by means of three terminals; to the starting, stopping and automatic control cut-off, by means of seven terminals 1, 2, 3, 4, 5, 6 and 7; and to the motor or machine to be controlled, by means of six terminals: Y, Z, X, U, V, and W.

The equipment is put in operation through the closing of the "start" contact 40 over the following circuit: line terminal L1, winding $Bo$, conductor 110, terminal 3, conductor 110', contacts 40 of the "Start" push button, ammeter A, terminal 2, and line terminal L2. Excitation of coil $Bo$ closes contacts 31, 32, 33 and starts the machine M through switch C assumed to be in its illustrated lower position as shown in the drawing. The motor connection circuits are as follows: (1) line terminal L1, contacts 31, closed contacts 19, conductor 100, winding 101, terminal U and machine M; (2) line terminal L2, conductor 115, terminal 2, ammeter A, terminal 1, coil or winding 106 of relay S2, conductor 114, contacts 32, conductor 113, coil 102, terminal V, and machine M; (3) line terminal L3, contacts 33, coil or winding 111 of relay S1, conductor 103, closed contacts 20, coil 104, terminal W, and machine M.

Terminals X and Y are connected to terminal 2 through closed contacts 22 and 21, respectively, these contacts thus constituting the common connection of the star, the outer ends of the machine windings being connected to line terminals L1, L2, and L3, respectively.

Winding $Bo$ remains energized, after the "Start" push button is released, over the following circuit starting from terminal 3: conductor 110', contacts 60 of the "Stop" push button, terminal 4, contacts 103, conductor 113, contacts 32, and line terminal L2.

As soon as machine M is started, the "Run" push button is pressed to close contacts 50, this push button being mechanically interlocked with the "Start" push button so that when one is closed the other is opened and vice versa.

Upon the running contact 50 being closed, the linebreaker will remain definitely closed and will open only at the end of the operation, by opening the stop contact 60, which de-energizes the linebreaker operating coil.

After closing contact 50, the operation of the motor (or machine) that, in the example shown in the Fig. 1 is being started with its windings star-connected, may be varied and automatically controlled by the relay S1 in response to the load or other external electrical characteristic depending upon the operating conditions.

In fact, one of the line conductors supplying the motor passes through the series winding of relay S1 and, for a predetermined setting, adjustable at will, closes contacts 8 over the following circuit: line terminal L3, contacts 33, coil or winding 111 of relay S1, coil or winding 116 of contactor $Ct$, closed contacts 8, contacts 14R, terminal 5, contact CCA, switcharm D, closed contacts D of the "Run" push button, conductor 117, closed contacts 60 of the "Stop" push button, terminal 4, contacts 105, conductor 113, contacts 32, and line terminal L2.

When contacts 8 close, coil 116 of contactor $Ct$ is energized to close contacts 10 and 11. Contacts 10 close a holding circuit for coil 116 as follows: coil 116, contacts 10, contacts 17, conductors 107 and 108, and to line terminal L2 as previously described.

Contacts 11 close the circuit for the operating coil 120 of the 5-pole star-delta switch C, which will therefore snap from the lower position (as shown in Fig. 1, corresponding to the star connection) to the upper position (corresponding to the delta connection) at the same time causing the opening of auxiliary contacts 14r and 17, and the closing of contacts 15.

The machine will then operate in accordance with the new position of the switch and, according to the example illustrated in the figure, the motor will then be operating with its windings delta-connected.

During the switching operation, the opening of contacts 21 and 22, corresponding, in the example shown, to the star center connection of the stator, will take place with a small delay in respect to the opening of contacts 19 and 20, corresponding to the ends of the stator windings opposite the star denter, in order to reduce the breaking induction currents.

At the same time as the operating coil 120 of the switch C is energized, the primary winding of the transformer Tr is energized, this transformer being a part of the limiting device $Lt$. Transformer Tr is energized over conductors 121, 122 connecting its primary winding in parallel with coil 120.

A first portion of the transformer secondary, through a resistance R, heats a bimetal strip B which, due to the action of the heat, bends. Its bending causes the deflection of a lever L, thus bringing about tilting of a mercury switch M1 and the opening of its contacts 12. With the further deflection of the bimetal strip B, the lever L will slip past strip B so as to return to its normal position, thus closing contacts 12. Immediately afterwards, the deflection of the bimetal will be such that the mercury switch M2, to the strip B, will have reached a degree of tilting sufficient to open its contacts 13. Upon the opening of contacts 13, the current flow through resistance R will be interrupted and consequently the bimetal strip will slowly cool off thus gradually returning to its initial position. As soon as this initial position is reached again, the mercury switch M2 will close contacts 13 and the bimetal deflection cycle will be repeated.

The current supplied from the second portion of the secondary of the transformer Tr, passing through contacts 12, excites an auxiliary winding 123 of relay S2, strongly magnetizing the relay core.

Relay S2 may be of any known type. However preferably the core of relay S2 will be constituted—as is shown on the drawing—by a soft steel rod in the form of a U, with smooth pole faces bridged without airgap by the movable armature P, also smooth.

Upon the flow of current through the auxiliary winding of the relay S2, the movable armature P will be immediately picked up by the core, and will thus close the magnetic circuit of the relay, consequently closing contacts 9.

Since the supply to the primary of transformer Tr is contemporary with the supply to the operating coil of switch C, contacts 9 will close at the same instant as the armature of switch C begins its upward movement.

The stability of contacts 9 is insured by the lack of vibration of the movable armature P wiping, without airgap, on the core of the relay S2.

The upward movement of the switch C actuates the three auxiliary contacts connected therewith in the following sequence: Contact 14r opens, thus making relay S1 ineffective, and just an instant before the end of the upward movement of the switch C, contacts 15 close while contacts 17 open. This latter cuts off the current to the operating coil of contactor $Ct$, with the consequent opening of contacts 10 and 11.

The contacts 15, through contacts 9 of relay S2, which will be already closed, now closes the energizing circuit for the operating coil 120 of switch C over the following circuit: contacts 50, terminal 7, contacts 9, armature P, conductor 124, contacts 15, coil 120, conductor 126, and line terminal L1, contacts 50 being connected to line terminal L2 through contacts 60, as previously described.

As a consequence of the resultant switching to the delta-connection, the current circulating through the winding of relay S2 will be increased, with respect to the earlier connection, and will therefore aid in keeping closed contacts 9, which, as already stated above, will already have been closed by the current flowing through the auxiliary winding of the relay S2. This current supplied from the second portion of the transformer Tr is, however, periodically interrupted for a short while by the opening of contacts 12, effected by the movement of the bimetal strip B.

During such interruptions, contacts 9 on relay S2 will remain closed if the current flowing in the winding 106 of relay S2 (line current supply to the motor) exceeds a certain value, adjustable at will, and corresponding to a predetermined load (or other predetermined condition).

Under these circumstances, the energization of operating coil 120 of switch C will exclusively depend on contacts 9 of relay S2 whereby, should the load (or other predetermined condition) decrease below the setting and remain below until the bimetal strip causes the opening of contacts 12, the contacts 9 will open and consequently cut off the exciting current to the operating coil of the switch C; this will then snap in the reverse direction, changing from the upper to the lower position, and varying the winding connections of the machine or motor (in the example, re-establishing the star connection).

Due to the hysteresis of the core of relay S2, the opening of contacts 12 will take place quickly, without oscillations, and therefore without damaging effects on the movement of switch C.

During the downward movement of switch C, contacts 15 open and contacts 17 close. Contacts 14r, provided with a time delay device, close after a short while so as to allow the machine conditions to become steadied after the oscillations brought about by the switching of the circuits.

After the closing of contacts 14r, the machine, under control of the relay S1, is again in condition to modify its connections (for instance passing again from the star to the delta connection).

The motor or machine, whatever be its connection, whether star or delta, can be stopped by merely pressing the "Stop" push-button to open contacts 60, which shuts off the exciting current to the operating coil Bo of line-breaker T, causing its tripping and the opening of contacts 31, 32 and 33.

The switch D permits the equipment to operate with the automatic operation of relay S1 cut off. To render relay S1 ineffective, switch D is disengaged from contact CCA and engaged with contact SCA.

Of course several modifications can be made in the above mentioned equipment; thus, for instance, the circuit modification effected by the switch may act, instead of on the star or delta connection of a motor, on the taps at different voltages of a transformer, or the series parallel connection of elements of a motor stator, or in other ways that may similarly serve to vary the operating conditions of a machine or motor.

Also, the relays S1 and S2 may be replaced by a single relay or by a plurality of relays; the switch C may be kept in its upper position by an electromagnetic device, whether or not in combination with mechanical arrangements; the equipment may be provided with remote controls, which is made easier by the grouping of the terminals, or assembled in whatever way, without departing from the scope of the invention.

Fig. 2 shows a somewhat modified arrangement, with respect to the preceding one, and embodying a control equipment for a three-phase motor also coming under the present invention.

More precisely, in this instance, the equipment is constituted by a line-breaker T1, a delta connection contactor T2, a star connection contactor T3, two relays S1 and S2 and a limiting device Lt. This equipment is connected to the power supply L1, L2 and L3 by means of three terminals; to a starting, running and stopping control panel with ammeter A, by means of leads as illustrated on the drawing, and with the motor or machine to be controlled, by means of six terminals: Y, Z, X, U, V and W.

Machine M is started by pressing "Start" push-button 24 which energizes the operating coil 130 of line-breaker T1 over the following circuit: terminal L1, conductor 131, button 24, conductor 132, coil 130, conductor 133, "Stop" push-button 26, conductor 134, contacts 41, conductors 136, and line terminal L2. Line-breaker T1 closes its main contacts 141, 142, and 143 and auxiliary contacts 27. These latter close a hold circuit for coil 130 from terminal L1, contacts 141, conductor 137, and contacts 27, thus shunting button 24.

Simultaneously with closing of line-breaker T, the operating coil 135 of the star-connection contactor T3 is energized over the following circuit: line terminal L2, conductor 136, contacts 41, conductor 134, button 26, conductors 133 and 138, contacts 44, conductor 144, coil 135, conductor 146, button 24, conductor 131, and line-terminal L1. Contactor T3 thereupon closes its main contacts 36, 37 and its auxiliary contacts 42, opening its auxiliary contacts 43. Contacts 36, 37 connect terminals Y and X to terminal Z at point 145, thereby establishing the star connection.

Contacts 43 break the energizing circuit for transformer Tr, and contacts 42 establish a hold circuit for coil 135 as follows: conductor 146, contacts 28 of relay S1, conductor 147, contacts 42, conductors 148 and 151, ammeter A, conductor 137, contacts 141 and line terminal L1, this circuit shunting button 24.

With contactors T1 and T3 closed, the motor (or machine) is started with its windings star-connected.

As soon as the motor has been started, the running contact 25 is closed. Upon closing the contact 25, contact 24 opens, since the two contacts are mechanically interlocked so that when one is closed the other is open and vice-versa. After closing of the running contact 25, the operation of the motor (or machine), which in the example shown in the figure is started with its windings star connected, can be varied and controlled automatically by relay S1, in response to the load or other electrical characteristic of it, depending from the operating conditions. In fact, the current supply to the motor passes through the winding 150 of relay S1 and, for a predetermined setting, adjustable at will, causes the opening of contact 28.

With the opening of contact 28, the operating coil 135 of contactor T3 is deenergized, and the contactor opens, thus opening the star center contacts 36, 37 and auxiliary contacts 42, but closing auxiliary contacts 43.

Contacts 43 energize transformer Tr as follows: conductors 151 and 148, contacts 43, transformer Tr, conductors 152, 153, and 154, thus connecting the transformer primary winding across line terminals L1 and L2.

A first portion of the secondary of transformer Tr warms up, as in the preceding example, by means of resistance R, the bimetal strip B that, by effect of the heat, deflects. In its deflection, it deviates the lever L causing the tilting of the mercury switch M1 and consequently opening contacts 38. Due to the further deflection of the strip B, lever L disengages and will return to its normal position, therefore closing contacts 38. Immediately afterwards, the flexure of the bimetal strip will be such that the mercury switch M2, secured to strip B, will have reached a degree of tilting sufficient to open contacts 39. With the opening of contacts 39, the current supplied to the resistance R is cut off, and consequently the strip B slowly cools off and gradually returns to its initial position. As soon as this initial position has been reached again, the mercury in the switch M2 will close contacts 39 and the cycle of flexure of the bimetal strip will repeat itself.

The current supplied from the second portion of the secondary of transformer T*r*, passing through contacts 38 and conductors 156, 157, energizes an auxiliary winding 155 on relay S2, strongly magnetizing its core.

Relay S2 may be of any known type. However preferably, the core of relay S2 will be constituted—as is shown on the drawing—by a soft steel rod in the form of a U, with smooth pole faces that are bridged without airgap by the movable armature P, also smooth.

With the current flowing through the auxiliary winding 155 of the relay S2, the movable armature P will be immediately picked up by the core and will close the magnetic circuit of the relay, thus closing contacts 29. The stability of contact 29 is assured by the lack of vibrations on the armature P wiping without airgap on the core of relay S2.

When contacts 36, 37 open, points 34 and 35 are at line voltage and the operating coil 160 of delta connection contactor T2 is energized as follows: point 34, conductor 161, contacts 29 (closed), conductor 162, coil 160, conductor 163, button 25, conductor 164, and point 35. The contactor T2 closes and the motor (or machine) is now running with its windings delta connected. With the closing of contactor T2 the auxiliary contacts 44 open, while contacts 33R close. Contacts 44 open the circuit of the operating coil of contactor T3.

Upon establishment of the delta connection of the machine, the main winding 165 of relay S2 is now in series with a phase winding of the motor (or machine), and the current flowing through it aids in keeping closed contacts 29 which, as already mentioned, will have been previously closed by the current flowing through the auxiliary winding 155 on said relay S2. This shunt current, supplied from the second portion of the transformer T*r* secondary, is, however, periodically interrupted for short instants, through the opening of contacts 38 by effect of the operation of the bimetal strip B. During such interruptions, the contacts 29 on the relay S2 will remain closed if the current flowing through the series winding 165 of the relay exceeds a certain predetermined value, adjustable at will, and corresponding to a predetermined load on the motor (or machine) or to another predetermined condition.

Under these circumstances, the energization of the operating coil 160 of the delta connection contactor T2 depends exclusively on the contacts 29 of relay S2 being closed; therefore, if the load (or other predetermined condition) should decrease below the setting value and remain below until the next opening of contacts 38, brought about by the bimetal strip B, this will cause the contacts 29 to open and consequently the energizing circuit of the operating coil 160 of contactor T2 will be opened.

Due to the hysteresis of the core of relay S2, the opening of contacts 29 takes place instantaneously, without oscillations, and therefore without damaging repercussion on the operation of the contactor T2. The opening of contacts 29 causes the tripping of the delta connection contactor T2. Upon the opening of the contactor T2, the auxiliary contacts 44 close thus re-establishing the energizing circuit of the operating coil 135 of the star connection contactor T3. The contactor T3 closes and the motor (or machine) windings are now star connected.

Upon the closing of contactor T3, the auxiliary contacts 43 open, thus cutting off the current supply to transformer T*r*, and the auxiliary contacts 42 close and, over the closed contacts 28, maintain the energizing circuit of the operating coil 135 of the contactor T3.

The auxiliary contacts 33R, provided with a time delay device, remain closed for an instant after the contactor T2 has opened, in order to maintain the excitation of the operating coil 135 of the contactor T3 even if the contacts 29 should open for an instant due to the current inrush that happens during the change-over from the delta to the star connection.

Upon the opening of the contacts 33R, the motor (or machine) is again conditioned to modify its connections, changing over again from the star to the delta connection, in the example shown.

The motor (or machine) whatever be its connections, whether star or delta, can be stopped by merely actuating a push button 26.

Naturally, the embodiment of the control equipment which is the object of the present invention, as well as the constructive details of the different parts of said equipment, can vary in accordance with the needs, without departing from the field of the present invention.

What I claim is:

1. In a dynamo-electric machine control apparatus having interlocked "start" and "run" controls sequentially operable to connect said machine to a circuit, the combination of switch means interconnected between said machine and said circuit and selectively operable to establish either a first or a second connection between said machine and said circuit; load current responsive means energized responsive to operation of the "run" control and selectively operable to operate said switch means to establish said second connection when the load current exceeds a pre-set value and to establish said first connection at load currents below said pre-set value; holding means operatively associated with said current responsive means; said holding means, when energized, conditioning said current responsive means to maintain said switch means operated to establish said second connection irrespective of decreases in load current below such pre-set value and, when de-energized, conditioning said current responsive means to operate said switch means to re-establish said first connection at load currents below such pre-set value; a periodic timer energized responsive to operation of said switch means to establish said switch means to establish said first connection; and a normally closed switch periodically and momentarily opened by said timer when energized and controlling energization of said holding means.

2. The combination claimed in claim 1 in which said machine is a polyphase motor, said first connection is a star connection, and said second connection is a delta connection.

3. The combination claimed in claim 1 in which said periodic timer includes an electrically heated thermostatic element operating a second normally closed switch in its energizing circuit.

4. The combination claimed in claim 1 in which said current responsive means includes a relay having a main coil in the load circuit; and said holding means comprises an auxiliary coil of said relay.

5. The combination claimed in claim 1 in which said periodic timer includes an electrically heated thermostatic element operating a second normally closed switch in its energizing circuit; said current responsive means includes a relay having a main coil in the load circuit; and said holding means comprises an auxiliary coil of said relay.

6. The combination claimed in claim 1 in which said switch means comprises a double throw contactor.

7. The combination claimed in claim 1 in which said switch means comprises a pair of electrically interlocked contactors each establishing one of said connections.

8. Apparatus for controlling the connections of a dynamo-electric machine to a circuit in accordance with load, said apparatus comprising, in combination, a contactor selectively operable to connect said machine to said circuit; switch means interconnected between said machine and said circuit and selectively operable to establish either a first or a second connection between said machine and said circuit; a "start" control selectively operable to close said contactor to start said machine with said switch means establishing such first connection; relay means; having main operating coil means in circuit with said machine, and armature means controlling operation of said switch means; said relay means, when the load current exceeds a pre-set value, operating said armature means to operate said switch means to establish said second connection; a "run" control interlocked with said "start" control for alternate operation with the latter and, when operated, conditioning said relay means to control operation of said switch means; auxiliary operating coil means for said relay means; a periodic timer energized responsive to operation of said switch means to establish said second connection and de-energized upon operation of said switch means to establish said first connection; and a normally closed switch periodically and momentarily opened by said timer when energized and controlling energization of said auxiliary coil means; said auxiliary coil means, when energized, maintaining said armature means operated irrespective of load current decreases below said pre-set value; said relay means, when said auxiliary coil means is de-energized contemporaneously with a decrease in load current below such pre-set value, releasing said armature means to operate said switch means to establish said first connection.

References Cited in the file of this patent

UNITED STATES PATENTS

| | | |
|---|---|---|
| 1,571,152 | Whittingham | Jan. 26, 1926 |
| 1,778,976 | Hunter | Oct. 21, 1930 |
| 1,858,082 | Foucault | May 10, 1932 |
| 2,280,914 | Johns | Apr. 28, 1942 |

FOREIGN PATENTS

| | | |
|---|---|---|
| 402,166 | Germany | Sept. 13, 1924 |
| 428,349 | Great Britain | May 10, 1935 |
| 469,935 | Great Britain | Aug. 3, 1937 |
| 914,079 | France | June 11, 1946 |